Dec. 15, 1959     S. D. ALEXANDROFF     2,917,036

VALVE ASSEMBLY FOR AN INTERNAL COMBUSTION ENGINE

Filed Oct. 3, 1958

INVENTOR.
SERGEI D. ALEXANDROFF.
BY *Alexander Riaboff*
ATTORNEY

United States Patent Office 2,917,036
Patented Dec. 15, 1959

2,917,036

VALVE ASSEMBLY FOR AN INTERNAL COMBUSTION ENGINE

Sergei D. Alexandroff, San Francisco, Calif.

Application October 3, 1958, Serial No. 765,175

13 Claims. (Cl. 123—188)

This invention relates to a valve assembly for an internal combustion engine.

In internal combustion engines the valves close with certain speed and force. In practice such speed is considerable, and therefore on each closing the valve head hits the valve seat with considerable force resulting in the wear of said seat and valve head face. This wear is considerably enhanced by the fact that the central axis of the valve usually does not coincide with the central axis of the valve seat at the moment of the impact because of the wear of the valve stem and the bushing in which it reciprocates. In the result of said wear, the valve remains partially open during the operation of the engine with the corresponding loss of power.

The object of this invention is to minimize the wear of the valve by lessening the force of the impact of the valve on the valve seat at the closure of the same, and by centering the valve in regard to the valve seat just before the valve seats into said seat.

Another object of this invention is to provide a valve assembly for an internal combustion engine which assembly includes a valve guide and a valve sliding in said guide and having means thereon by which the force of the impact of the valve on the valve seat is transferred in major portion to said guide just before the valve head hits the valve seat.

Other objects and advantages will appear as the specification proceeds and the novel features of the device will be particularly pointed out in the claims hereto annexed.

In this specification and the annexed drawings, the invention is illustrated in the form considered to be the best, but it is understood that the invention is not limited to such form; and it is also to be understood that in and by the claims following the description, it is desired to cover the invention in whatsoever form it may be embodied.

My invention is illustrated in the accompanying drawings in which.

Figure 1:
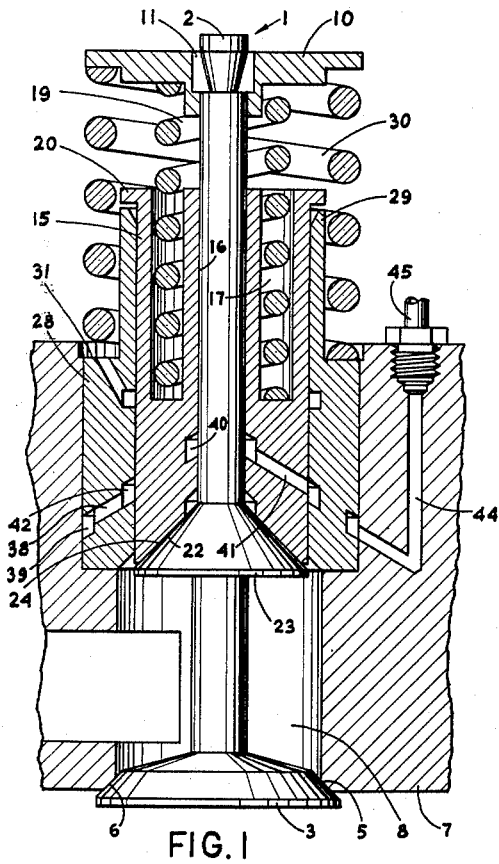
Fig. 1 is a vertical central cross-section of the valve assembly showing the valve in closed position.

In detail, my invention comprises a valve 1 having a usual stem 2 and a head 3. The latter is round and has one side of it bevelled to form a valve face 5. The latter, when seated in a usual bevelled valve seat 6 formed in a cylinder head or block 7, closes the passage from the explosion chamber into a space 8 beyond the balve 1. The stem 2 carries on its end a spring retainer 10 secured thereto by a standard lock 11. The valve head 3 opens and closes the valve seat 6 with each explosion in the chamber and is subjected to great temperatures developed therein.

The stem 2 reciprocates in a special guide 15 which is bored at its center, as shown at 16. The upper portion of said guide 15 is formed with a circular recess 17 in which a guide coil spring 19 is placed. The latter extends to said spring retainer 10 and exerts pressure on said guide 15 pushing the same downwardly.

The guide 15 carries a horizontal circular flange 20 on the upper end thereof which limits the downward motion of said guide, as hereinafter shall be explained in detail.

The lower end of said guide 15 is provided with an inwardly directed frusto-conical auxiliary depression 22, while the valve stem 2 is provided with a wide auxiliary head 23 of substantially the same diameter as the guide 15 and having a large frusto-conical face 24 which fits into the depression 22. The guide 15 is a comparatively large cylinder which moves back and forth only a few thousandths of an inch, and therefore its wear is negligible. Therefore it is used for centering the valve 1 in relation to the valve seat 6. When the auxiliary head 23 seats in the depression 22, the valve 1 becomes centered in regard to said guide 15 and consequently to the valve seat 6.

The guide 15 is arranged for vertical reciprocation in a stationary cylinder 28 which is compressed into the cylinder head 7. The stationary cylinder 28 is centrally bored to slidably accommodate the guide 15. The cylinder 28 extends almost the full length of said guide and terminates just a few thousandths of an inch below the flange 20 when the valve is closed. The upper portion 29 of the cylinder 28 is reduced in diameter to approximately the outer diameter of the flange 20 and is surrounded by a valve coil spring 30 which extends from the valve spring retainer 10 to the cylinder shoulder 31 and constantly urges said valve upwardly, that is, to stay closed.

The operation of the valve is as follows: when the valve 1 is pressed downwardly by a mechanism not shown in the drawing, the valve spring 30 becomes compressed and the valve 1 moves downwardly. This motion unseats the valve head 3, thus opening the valve seat 6. At the same time the pressure of the guide spring 19 forces the guide 15 downwardly, but this motion is limited only to a few thousandths of an inch by the flange 20, the downward motion of which is stopped by the portion 29 of the cylinder 28. The auxiliary head 23 moves partially out of the depression 22. It shall be noted that the auxiliary head 23 is a few thousandths of an inch closer to the wall of the depression 22 than the valve head 3 to its seat. When the downward pressure on the valve is released, the valve spring 30 and coil spring 19 push the valve 1 upwardly, whereupon the auxiliary head 23 seats first into the depression 22 and thereby centers the valve head 3. Thereafter the valve 1 under action of spring 30 travels upwardly with the guide 15 just a few thousandths of an inch before its head 3 rests in the valve seat 6. At that time the spring 19 does not act, since latter spring presses on the valve spring retainer 10 upwardly, and on the guide 15—downwardly.

The opening and the closing of the valve 1 occurs with great rapidity and in an ordinary valve with each closing of the same the valve face hits the valve seat with great force. In the present valve, the wide auxiliary head 23 hits the depression 22 just before the valve face 5 hits the valve seat 6 and thus absorbs the force of the impact. The auxiliary head 23 is not subjected to the direct action of hot gases of the explosion chamber and therefore is kept at comparatively low temperature. This fact combined with the comparatively large contact surface between said head 23 and the depression 22 insures long wear of said head and depression and guarantees for a long time the proper centering of the valve which occurs just before the valve face 5 contacts the valve seat 6. Therefore, the head 3 of the valve 1 is properly centered just before the valve face 5 hits the valve seat 6, and the force of this impact is reduced many times.

The valve stem 2 is constantly lubricated and in order to prevent oil from escaping into the space 8 the same is constantly sucked out by the vacuum inside of a separator 35 presently to be described. A circular groove 40 is provided in the guide 15 in close vicinity of the depression 22, which groove collects oil passing around the stem 2 downwardly. The latter groove communicates by a passage 41 with a circular oil collector groove 42 provided on the inner surface of the cylinder 28. The groove 42 collects an excess of oil passing between said cylinder and the guide. The latter groove is connected by a passage 38 to a groove 39 formed in the outer circumference of the cylinder 28. A passage 44 connects the groove 39 with an oil pipe 45 leading to said separator 35. The latter represents a hollow cylindrical vessel 50 having a chamber 51 closed on the top by a cover 52, to which said pipe 45 is connected. A passage 53 connects said pipe with the interior of the vessel 50.

The vessel 50 contains a centrally located vertical hollow guide 55 in which a cylindrical piston 56 is arranged. The latter is preferably hollow inside and extends into a vertical bore 57 in the cover 52. The bore 57 is closed at the top by a plug 59. A space 60 in said bore 57 separates the plug 59 from the piston 56.

The vessel 50 also contains a float 62 which is arranged around said guide 55. The float 62 is provided with hooks 63 by which the same is suspended from a flange 65 provided on the piston 56 when the vessel 50 is empty. Oil accumulating in the chamber 51, gradually raises the float 62, which through the spring 67 raises the piston 56 until the upward movement of the same is stopped by the plug 59. The upward movement of the piston 56 opens an opening 69 for air which passes into the guide 55 and therefrom through a conduit 70 into the chamber 51.

The cover 52 is connected by a pipe 71 with a source of vacuum, such as an intake manifold, not shown in the drawing. A passage 72 in said cover connects the pipe 71 with a passage 73 in the plug 59, which in turn communicates with the space 60 in the bore 57. An angular passage 75 connects said space 60 with the chamber 51. As long as the above passages remain in communication, the chamber 51 and the above described passages in the valve construction are under constant vacuum, and oil and air are constantly drawn into the chamber 51 from the valve assembly.

When the piston 56 rises, as above described, the upper end of the piston 56 closes the angular vacuum passage 75 thus cutting off the vacuum from said chamber. The further movement of the piston 56 uncovers the conduit 70, whereupon the air, admitted through the opening 69 enters the guide 55 and therefrom into an angular conduit 70 and into the chamber 51. A small passage 77 connects the passage 72 with a bore 79 extending from the bottom of said vessel 50 to the cover 52 and which communicates with the chamber 51 by an upper opening 80 and a lower opening 81. The upper opening 80 is just under a head 83 of an oil releasing piston 84, the stem of which extends downwardly and closes an oil outlet 85, which communicates with the chamber 51 by an oil passage 87.

Figure 3:
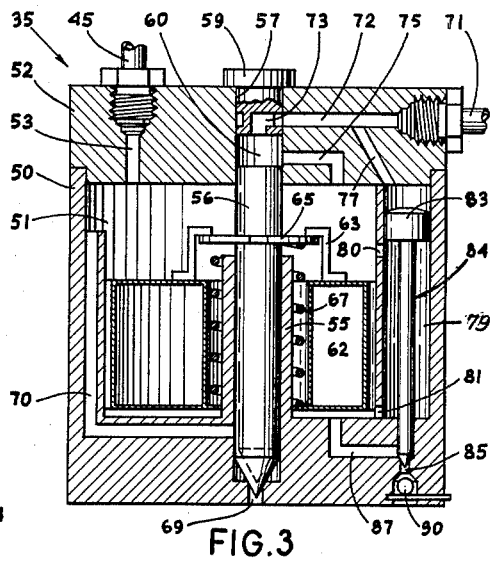
Fig. 3 is a vertical central cross-section of an oil separator.
Figure 4:
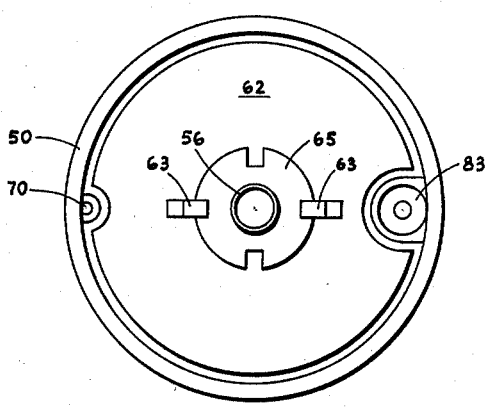
Fig. 4 is a plan view of said oil separator taken without the cover.

When the vacuum is cut off from the chamber 51 and the same is filled up with the air, the vacuum acting above the head 83 and the atmospheric pressure of air under said head force the latter upwardly, thus opening the oil outlet 85. The oil in the chamber 51 flows therefrom through the oil passage 87, oil outlet 85 and out until all oil is exhausted from the chamber 51. Then the piston 56 settles down in the position as shown in Fig. 3, and closes the air opening 69, whereupon the oil releasing piston 84 also settles down, thus closing the oil outlet 85.

A ball return valve 90 is provided in the oil outlet 85 to prevent the entrance of air into the chamber 51 while the piston 84 is moving down to close said outlet.

Figure 2:
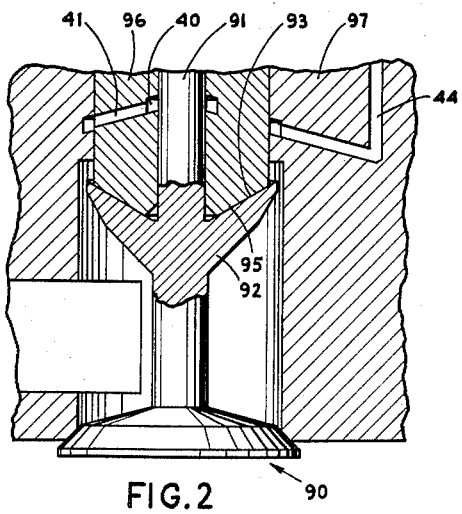
Fig. 2 is a partial vertical central cross-section of a modified form of the valve assembly.

Fig. 2 shows a modified form of the valve assembly in which a valve 90 with a stem 91 has an auxiliary head 92 on said stem. The head 92 is conical outwardly and has a conical cavity 93 facing upwardly in which a frusto-conical end 95 of a guide 96 rests, which arrangement shows the above described parts in reverse to the one shown in Fig. 1, wherein the auxiliary head 23 is formed with the frusto-conical end which enters the depression 22 in the guide 15.

It shall be noted that the guide 96 is arranged for sliding in a motor head or block 97, and the cylinder 28, shown in Fig. 1, is thus eliminated. In all other respects the construction of the respective valve assemblies are identical and they operate in the same way.

I claim:

1. A valve assembly for an internal combustion engine having a valve seat, comprising a valve guide slidable in the engine, a valve slidably arranged in said guide, spring means for urging said valve to stay closed, means on the valve and on said guide for absorbing the major portion of the impact force closing the valve and for centering the valve in relation to its seat.

2. A valve assembly for an internal combustion engine having a valve seat, comprising a valve guide slidable in the engine, a valve slidably arranged in said guide, spring means for urging said valve to stay closed, an auxiliary head carried by said valve, said head in cooperation with the guide being adapted to center said valve in relation to said valve seat and to absorb the major portion of the impact force closing the valve.

3. A valve assembly for an internal combustion engine having a valve seat, comprising a valve guide slidable in the engine, a valve slidably arranged in said guide, spring means for urging said valve to stay closed, an auxiliary head carried by said valve, said head and said guide having means therein for centering said valve in relation to the valve seat and for absorbing the major portion of the impact force closing the valve just before the same is closed.

4. A valve assembly for an internal combustion engine having a valve seat, comprising a valve guide slidable in the engine, a valve slidably arranged in said bushing, spring means for urging said valve to stay closed, an auxiliary head carried by said valve, said head and said bushing end being so arranged that one enters the other just before the valve seats in the valve seat for centering said valve in relation to said seat and for absorbing the impact of closing said valve.

5. A valve assembly for an internal combustion engine having a valve seat, comprising a valve guide slidable in the engine, a valve slidably arranged in said guide, spring means for urging said valve to stay closed, a frusto-conical auxiliary head carried by said valve, said guide having a frusto-conical depression for admitting said auxiliary head for centering said valve in relation to said valve seat and for absorbing the shock of closing said valve.

6. A valve assembly for an internal combustion engine having a valve seat, comprising a valve guide slidable in the engine, a valve slidably arranged in said guide, spring means for urging said valve to stay closed, an auxiliary head carried by said valve, said head being formed with a depression for admission of the end of the guide thereinto to center said valve in relation to said valve seat and to absorb the shock of closing said valve just before the closing of the same.

7. A valve assembly for an internal combustion engine having a valve seat, comprising a valve guide slidable in the engine, a valve slidably arranged in said guide, spring means for urging said valve to stay closed, second spring means for urging said guide toward the valve seat, means for limiting the latter motion of the guide, an auxiliary head carried by the valve and adapted to contact said guide for pushing the same against the compression of said second spring means just before the valve seats in the valve seat for absorbing the impact of the motion of the valve on its closing stroke.

8. A valve assembly for an internal combustion engine having a valve seat, comprising a valve guide slidable in the engine, a valve having a stem and a head slidably arranged in said guide, first spring means for closing said valve by pressing said valve head against said valve seat, second spring means for urging said guide in opposite direction to that of the first spring means, an auxiliary head on the stem of the valve means on said auxiliary head and on said end of the guide for centering said valve in relation to said valve seat, said auxiliary head contacting said guide on the valve's closing stroke just before the valve head contacts the valve seat and moving said guide a short distance against the pressure of the second spring means, thereby cutting the force of the impact of closing the valve.

9. A valve assembly for an internal combustion engine having a valve seat, comprising a valve guide slidable in the engine, a valve having a stem and a head slidably arranged in said guide, first spring means for closing said valve by pressing said valve head against said valve seat; second spring means for urging said guide in opposite direction to that of the first spring means; a frusto-conical auxiliary head on the stem of the valve in near proximity to the end of the guide; a depression on said end of the guide for admitting thereinto said auxiliary head for centering said valve in relation to said valve seat, said auxiliary head contacting said guide on the valve's closing stroke just before the valve head contacts the valve seat and moving said guide a short distance against the pressure of the second spring means, thereby cutting the force of the impact of closing the valve.

10. A valve assembly for an internal combustion engine having a valve seat, comprising a valve guide slidable in the engine, a valve having a stem and a head slidably arranged in said guide, a first spring means for closing said valve by pressing said valve head against said valve seat; a second spring means extending from said guide to the valve stem top for urging said guide in direction to the valve head; a frusto-conical auxiliary head on the stem of the valve in near proximity to the end of the guide; a depression on said end of the guide for admitting thereinto said auxiliary head for centering said valve in relation to said valve seat, said auxiliary head contacting said guide on the valve's closing stroke just before the valve head contacts the valve seat and moving said guide a short distance against the pressure of the second spring means, thereby cutting the force of the impact of closing the valve.

11. A valve assembly for an internal combustion engine having a valve seat, comprising a valve guide slidable in the engine, a valve having a stem and a head, said stem being slidable in said guide, a spring retainer on the stem end; a first spring means for closing said valve by pressing said valve against said valve seat; a second spring means abutting said guide and extending to said spring retainer for urging said guide in direction toward the valve head; a frusto-conical auxiliary head on the stem of the valve in near proximity to the end of the guide; a depression on said end of the guide for admitting thereinto said auxiliary head for centering said valve in relation to said valve seat, said auxiliary head contacting said guide on the valve's closing stroke just before the valve head contacts the valve seat and moving said guide a short distance against the pressure of the second spring means, thereby cutting the force of the impact of closing the valve.

12. A valve assembly for an internal combustion engine, having a valve seat, a valve guide slidable in said engine, and having a central longitudinal bore therein, a valve having a stem and a head, said stem slidable in said bore, a spring retainer on the stem end; a first spring means for closing said valve by pressing said valve against said valve seat; a second spring means abutting said guide and extending to said spring retainer for urging said guide in direction toward the valve head, an auxiliary head on said stem located between said valve head and the guide and in close vicinity to the latter, said head being frusto-conical in form; frusto-conical depression in the end of the guide for admitting thereinto said auxiliary head for centering the valve head in relation to said valve seat; said auxiliary head contacting said guide on the valve's closing stroke just before the valve head contacts the valve seat; and moving said guide a short distance against the pressure of the second spring thereby minimizing the force of the impact of closing the valve.

13. A valve assembly as described in claim 9, wherein said valve guide has a circular oil collecting groove around the valve stem for collecting the excess of oil passing around the valve stem, said engine having a second oil collecting groove for collecting the excess of oil passing around the valve guide, said guide having a passage connecting said oil collecting grooves and means for pumping oil from said second oil collecting groove.

References Cited in the file of this patent

UNITED STATES PATENTS

| 912,150 | McCollum | Feb. 9, 1909 |
| 1,552,547 | Disch | Sept. 8, 1925 |
| 2,856,026 | Wahmann | Oct. 14, 1958 |

FOREIGN PATENTS

| 382,023 | France | May 18, 1907 |